(12) United States Patent
Eyssautier et al.

(10) Patent No.: US 11,338,443 B2
(45) Date of Patent: May 24, 2022

(54) DEVICE FOR MANAGING THE MOVEMENTS OF A ROBOT, AND ASSOCIATED TREATMENT ROBOT

(71) Applicant: CAPSIX, Villeurbanne (FR)

(72) Inventors: François Eyssautier, Saint Cyr Au Mont d'Or (FR); Guillaume Gibert, Lyons (FR)

(73) Assignee: CAPSIX

( * ) Notice: Subject to any disclaimer, the term of this patent is extended or adjusted under 35 U.S.C. 154(b) by 139 days.

(21) Appl. No.: 16/625,704

(22) PCT Filed: Jun. 21, 2018

(86) PCT No.: PCT/EP2018/066672
§ 371 (c)(1),
(2) Date: Dec. 21, 2019

(87) PCT Pub. No.: WO2019/002104
PCT Pub. Date: Jan. 3, 2019

(65) Prior Publication Data
US 2021/0154852 A1 May 27, 2021

(30) Foreign Application Priority Data

Jun. 26, 2017 (FR) .................................. FR1755812

(51) Int. Cl.
*B25J 9/16* (2006.01)
*G05B 19/401* (2006.01)

(52) U.S. Cl.
CPC .......... *B25J 9/1697* (2013.01); *G05B 19/401* (2013.01); *G05B 2219/37205* (2013.01); *G05B 2219/45084* (2013.01)

(58) Field of Classification Search
USPC ....................................................... 700/259
See application file for complete search history.

(56) References Cited

U.S. PATENT DOCUMENTS

| 5,083,552 A * | 1/1992 | Lipowitz | A61H 37/00 601/1 |
| 6,267,737 B1 * | 7/2001 | Meilus | A61H 1/008 601/108 |

(Continued)

FOREIGN PATENT DOCUMENTS

| EP | 1530107 | 5/2005 |
| EP | 2070641 A2 | 6/2009 |

(Continued)

OTHER PUBLICATIONS

Ming-Kuei Hu, "Visual Pattern Recognition by Moment Invariants," IRE Transactions on Information Theory, Feb. 1962, p. 179-87.

(Continued)

*Primary Examiner* — Mohammad Ali
*Assistant Examiner* — Joshua T Sanders
(74) *Attorney, Agent, or Firm* — Forge IP, PLLC

(57) ABSTRACT

The invention relates to a device for managing the movements of a robot configured to treat a surface, said device including:
acquisition means for acquiring a three-dimensional representation (Re) of said surface to be treated; and
determination means for determining a sequence of movements on the basis of said three-dimensional representation (Re) of said surface to be treated;
said determination means comprising at least one three-dimensional generic model (m1-m3) for which a plurality of sequences of movements (Tx) are known;
said device including adjustment means for adjusting said generic model (m1-m3) with said three-dimensional representation (Re) of said surface to be treated that are able to deform said generic model (m1-m3) and known (Continued)

sequences of movements (Tx) so as to correspond to said three-dimensional representation (Re) of said surface to be treated.

10 Claims, 1 Drawing Sheet

(56) References Cited

U.S. PATENT DOCUMENTS

| | | | |
|---|---|---|---|
| 10,034,814 B2 | 7/2018 | Zhang | |
| 2005/0089213 A1* | 4/2005 | Geng | G06K 9/00214 |
| | | | 382/154 |
| 2006/0181236 A1 | 8/2006 | Brogardh | |
| 2008/0270069 A1* | 10/2008 | Cros | G06T 17/20 |
| | | | 702/152 |
| 2011/0202068 A1* | 8/2011 | Diolaiti | B25J 9/161 |
| | | | 606/130 |
| 2014/0257543 A1 | 9/2014 | Rhodes et al. | |
| 2017/0266077 A1* | 9/2017 | Mackin | A61G 13/125 |
| 2017/0360578 A1* | 12/2017 | Shin | B33Y 50/00 |

FOREIGN PATENT DOCUMENTS

| | | |
|---|---|---|
| JP | H02148307 A | 6/1990 |
| JP | H10128684 A | 5/1998 |
| JP | 2001246582 A | 9/2001 |
| WO | WO2015187092 A1 | 12/2015 |
| WO | WO2016125464 | 8/2016 |

OTHER PUBLICATIONS

Sklansky, "Finding the convex hull of a simple polygon," Pattern Recognition Letters, vol. 1, Issue 2, Dec. 1982, pp. 79-83.

Suzuki et al., "Topological structural analysis of digitized binary images by border following," Computer Vision, Graphics, and Image Processing, vol. 30, Issue 1, Apr. 1985, pp. 32-46.

* cited by examiner

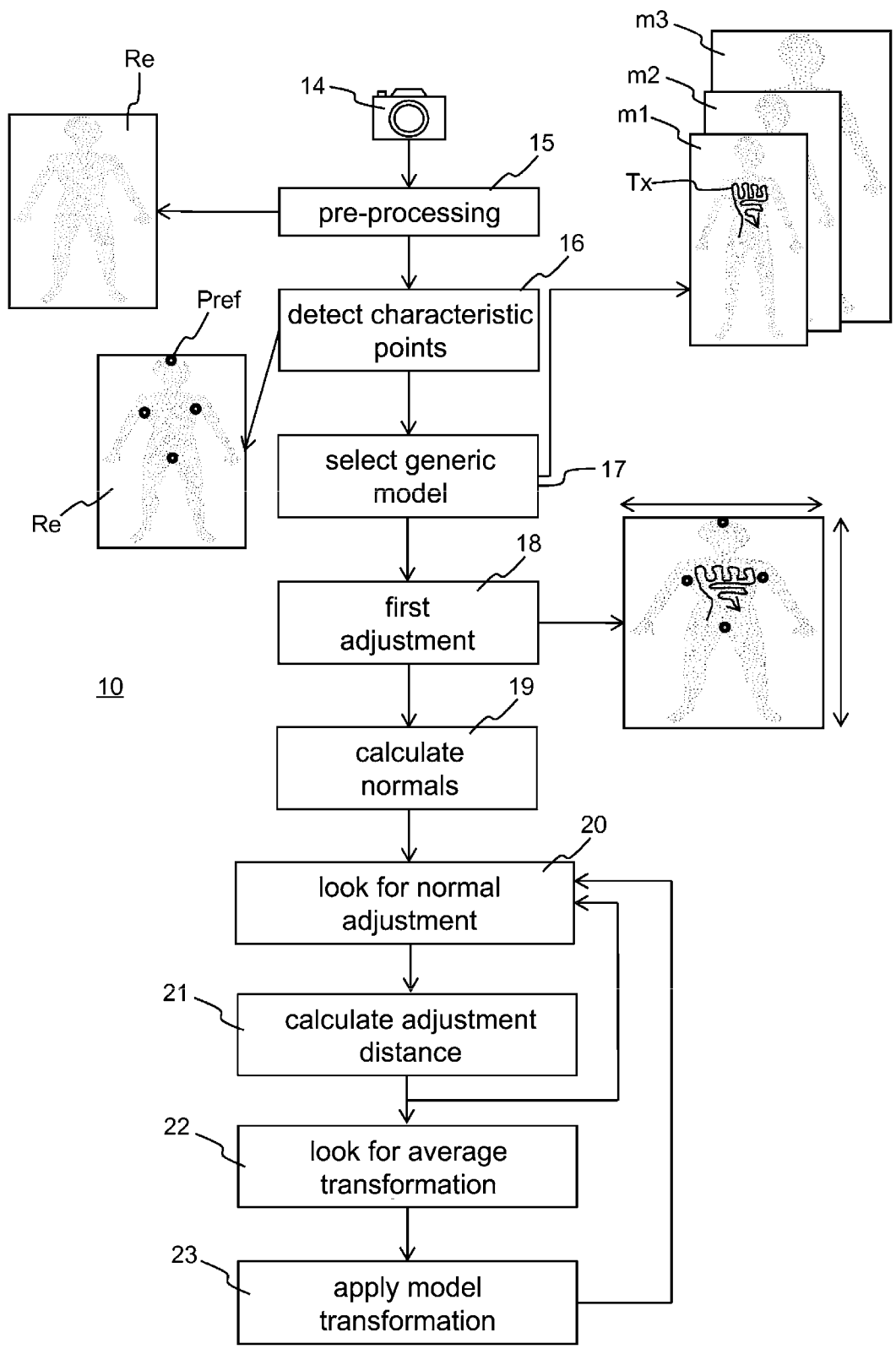

DEVICE FOR MANAGING THE MOVEMENTS OF A ROBOT, AND ASSOCIATED TREATMENT ROBOT

TECHNICAL FIELD

The invention relates to the field of managing the movements of a robot operating on surfaces of very diverse geometries.

The invention can be applied in numerous technical fields wherein the working surface of the robot is not known a priori. For example, the invention can be implemented for a robot for painting artisanal porcelains wherein the robot must be adjusted to the different shapes of the porcelain produced by an artisan.

The invention provides a particularly advantageous application for moving a motorized arm of a treatment robot, such as a massage robot.

PRIOR ART

Unlike industrial robots programmed to follow a predetermined path, a robot operating on an unknown surface must include movement management means capable of analyzing the surface to be treated in order to determine a path.

Recognition robots generally incorporate at least one camera and image processing means for analyzing, over time, the exploration surface and determining the path to be followed by the robot.

This method of analyzing an unknown surface requires a high computing power to precisely guide the movements of the robot over time. It follows that exploration robots move slowly so as to enable the device for managing the movements to optimize the movements of the robot on the basis of the information acquired by the camera and processed by the image processing means.

Additionally, for a massage robot or for a robot for painting artisanal porcelains, the movements of the robot must be extremely accurate in order to massage the desired areas on the body of an individual or to apply the layers of paint to the desired areas.

To do this, it is known to scan a three-dimensional surface in order to enable an operator to program the movements of a robot using three-dimensional numerical modeling of the surface to be treated by the robot.

For example, International Patent Application No. WO 2015/187092 describes a massage robot comprising a three-dimensional scanner for scanning the body of a patient and enabling a practitioner to determine the massage path of the robot by using a projection of a three-dimensional model of the body of a patient on a touch pad.

However, this massage robot is not autonomous because a practitioner must be present to make use of his know-how and program a path of the massage robot on a digital model.

Therefore, the technical problem consists in automating the management of the movements of a robot operating on an unknown surface with high movement accuracy.

DISCLOSURE OF THE INVENTION

The present invention aims to solve this technical problem by means of a plurality of known sequences of movements for a generic model associated with means for adjusting a surface to be treated with the generic model so as to adjust the known sequences of movements for a generic model and apply them to the surface to be treated.

Thus, although the geometry of the surface to be treated is not known when programming the sequences of movements on the generic model, the robot is capable of automatically adjusting the sequences of movements by adjusting the shape of the generic model to the shape of the surface to be treated.

For this purpose, according to a first aspect, the invention relates to a device for managing the movements of a robot configured to treat a surface, said device including:

acquisition means for acquiring a three-dimensional representation of said surface to be treated; and determination means for determining a sequence of movements on the basis of said three-dimensional representation of said surface to be treated.

The invention is characterized in that said determination means incorporate at least one three-dimensional generic model for which a plurality of sequences of movements are known; said device including adjustment means for adjusting said generic model with said three-dimensional representation of said surface to be treated that are able to deform said generic model so as to correspond to said three dimensional representation of said surface to be treated, the deformations of said generic model being applied to the known sequences of movements so as to obtain at least new sequences of movements adjusted to the dimensions of said surface to be treated; said robot being configured to treat said surface on the basis of one of the new sequences of movements.

The invention thus enables the use of a plurality of known sequences of movements on a generic model in order to apply them to a surface to be treated, the geometry of which is not known when learning the sequences of movements. In the example of the robot for painting artisanal porcelains, a painter can define the standard designs to be painted on cups by recording these designs with respect to a generic model of a standard cup. A robot can then scan the surface of a newly created cup and apply one of the standard designs by deforming the generic model on the basis of the surface of the newly created cup.

In the example of a massage robot, a generic model of a human body is made from measurements on real people. This generic model is then represented in three dimensions so that a practitioner can define a massage path passing by different sensitive points of the generic model so as to obtain an effective massaging effect.

These sensitive points of the generic model may match areas, for example an area extending within a radius of 50 mm around a sensitive point in a normal direction to the surface at the level of this point.

When the robot is used to massage a new patient, the patient's body is scanned and the shape of the generic model is adjusted to the patient's shape so that the deformation of the generic model allows obtaining a deformation of the massage path in order to adjust the movements of the robot to the patient's body shape, while respecting the massage accuracy recorded by the practitioner. As a result, the invention enables reproducing a very high level massage quality with a massage sensation very close to, or even identical, to that of a practitioner.

According to the invention, several massage paths can be digitized in order to carry out several different types of massage. Several generic models can also be made to improve the adjustment of the generic model to the patient's body, for example by using three types of generic models for each gender: a large, small and medium size person, and for different ages: children, teenagers and adults.

According to an embodiment, at least one known sequence of movements incorporates positions for which actions are programmed for said robot.

This embodiment enables controlling the operation of actuators during the movements of the robot. In the example of the robot for painting artisanal porcelains, the robot can perform specific surface treatments at certain locations. In the example of the massage robot, certain positions of the robot can control the triggering of heating means to improve comfort and/or the effect of the massage. In addition, the known sequence of movements may include a plurality of paths carried out with a palpating-rolling movement while other movements are carried out with another type of movement.

According to an embodiment, said generic model and said three-dimensional representation of said surface to be treated being formalized in the form of scatter plots, said adjustment means include:
- calculation means of a normal direction to??? each point of said three-dimensional representation of said surface to be treated; and
- search means for each point of the scatter plot of said three-dimensional representation, of the point of the generic model in a close vicinity for which the difference between the normal direction of the point of the generic model and the normal direction of the point of interest is the smallest;
- determination means of a distance between said detected point of the generic model and said point of interest; and
- search means of an overall transformation of the model on the basis of the distances determined for all the points of the scatter plot of said three-dimensional representation.

The normal directions enable obtaining information relating to the orientation of the sides of the generic model and of the three-dimensional representation of the surface to be treated. Unlike a simple comparison of point-to-point coordinates, a comparison of the sides enables obtaining a more efficient recognition.

Additionally, the adjustment of the generic model is carried out step by step by gradually modifying the generic model on the basis of the average of the distances. As a result, this embodiment enables adjusting the generic model effectively by comparing the normal directions of each point of the generic model and the normal directions of the three-dimensional representation of the surface to be treated.

According to one embodiment, said search means are configured for searching the points of the generic model in a predefined sphere around the point of interest. This embodiment aims to limit the search area of the points of the generic model so as to limit the calculation time. Additionally, the limitation of the search area also enables limiting the range of the modification of the generic model between two comparisons so as to increase the accuracy of the modification of the generic model.

According to one embodiment, the normal directions are determined by constructing a side by means of the coordinates of the three or four points closest to the point of interest.

This embodiment enables the efficient construction of the sides of the generic model and of the three-dimensional representation of the surface to be treated.

According to one embodiment, said adjustment means include:
- means for detecting characteristic points on said three-dimensional representation; and
- means for deforming the generic model in rotation and/or translation, so that said position of said characteristic points corresponds to a position of characteristic points of the generic model.

This embodiment enables carrying out a first rough adjustment of the generic model in order to improve the speed of the exact adjustment carried out by means of the normals. In the example of the robot for painting artisanal porcelains, the characteristic points may correspond to the upper and lower ends of the porcelain. In the example of the massage robot, the characteristic points may correspond to the upper end of the skull, to the position of the armpits and to the position of the groin.

According to one embodiment, said acquisition means include pre-processing means of said three-dimensional representation by means of capturing a plurality of three-dimensional representations and performing an average of the coordinates of the points among the different three-dimensional representations. This embodiment enables improving the accuracy of the three-dimensional representation and, therefore, of the adjustment of the generic model.

According to one embodiment, said pre-processing means carry out a filtering of said average of the coordinates of the points among the different three-dimensional representations.

This embodiment also enables improving the accuracy of the three-dimensional representation and, therefore, of the adjustment of the generic model.

According to a second aspect, the invention relates to a treatment robot including:
- an articulated arm;
- an effector placed at one end of the articulated arm;
- a three-dimensional image capture device; and
- a device for managing the movements according to the first aspect of the invention.

This second aspect of the invention relates to a treatment robot for which the accuracy of the movements of the robot is an essential requirement for avoiding injury to the patient.

According to one embodiment, said acquisition means are arranged on said articulated arm or on said effector. This embodiment enables moving the acquisition means in order to accurately acquire the three-dimensional representation.

BRIEF DESCRIPTION OF THE FIGURES

The mode of carrying out the invention as well as the advantages which result therefrom will emerge clearly from the embodiment which follows, given for information purposes but non-limiting, with reference to FIG. 1, which consists of a flow chart of the operating steps of a device for managing the movements of a massage robot according to an embodiment of the invention.

The invention is disclosed referring to a massage robot so as to show the robot's adjustment ability, since, obviously, the surfaces of human bodies have large disparities.

However, the invention is not limited to this specific application, and it can be used for a plurality of robots working on a surface whose geometry is not predetermined and for which accurate movements of the robot must be carried out.

DETAILED DESCRIPTION OF THE INVENTION

As shown in FIG. 1, the analysis of the surface to be treated is carried out by acquisition means 14, capable of providing a three-dimensional representation Re of the surface to be treated.

The three-dimensional representation Re takes the form of a scatter plot wherein each point has three coordinates of an orthonormal system: x, y and z.

These acquisition means 14 may correspond to a set of photographic sensors, a set of infrared sensors, a tomographic sensor, a stereoscopic sensor or any other known sensor enabling the acquisition of a three-dimensional representation of a surface.

For example, the Kinect® camera from Microsoft® can be used to obtain this three-dimensional representation Re.

To obtain this three-dimensional representation Re without capturing the environment, it is possible to capture a first scatter plot corresponding to the environment and a second scatter plot corresponding to the surface to be treated in its environment. Only the different points between both scatter plots are kept so as to extract from the environment the points corresponding to the surface to be treated. This method enables getting away from a standardized environment for recording and adjusting to any environment.

As shown in FIG. 1, these sensors 14 are often implemented with the pre-processing means 15 in order to provide a three-dimensional representation Re with improved quality or accuracy. For example, the pre-processing means 15 may correspond to an algorithm for equalizing histograms, filtering, averaging the representation on a plurality of successive representations . . . .

For example, it is possible to use the approach disclosed in the scientific publication "KinectFusion: Real-time 3D Reconstruction and Interaction Using a Moving Depth Camera*" published on Oct. 16, 2011 in UIST'11.

The device then implements computer processing in order to adjust a generic model m1, m2, m3 to the three-dimensional representation Re so as to transfer to the three-dimensional representation Re sequences of movements Tx pre-programmed on each generic model m1, m2, m3. For example, the sequences of movements Tx may be projected onto the second scatter plot corresponding to the surface to be treated. Additionally, these sequences of movements Tx may include positions for which actions are pre-programmed for said robot.

The generic models m1, m2, m3 also are formalized in the form of a scatter plot, wherein each point presents three coordinates of an orthonormal system: x, y and z. Preferably, the generic model is composed of an average model ModMoy of N vertex of three coordinates and a deformation matrix ModSigma of M morphological components by 3N coordinates, i.e., three coordinates for N vertex.

A large number of different people are needed to enrich each generic model m1, m2, m3, for example one thousand people.

An analysis of main components is applied to reduce data size. By applying an analysis of main components to these data, it is possible to determine the variation in the data and to associate the common variation on a component. Thus, instead of keeping one component per person, each generic model m1, m2, m3 stores about twenty components that will explain the majority of the variation for the thousand people.

This method is disclosed in more detail in the scientific publication "Building Statistical Shape Spaces for 3D Human Modeling, Pishchulin & all" published on Mar. 19, 2015 in the journal "Published in Pattern Recognition 2017".

Preferably, the generic models m1, m2, m3 are stored in a memory accessible by the image processing means of the device capable of adjusting a generic model m1, m2, m3 to the three-dimensional representation Re.

To do this, when the three-dimensional representation Re is obtained, the device implements a detection of the characteristic points Pref of this three-dimensional representation Re by digital processing means 16. In the example of FIG. 1, the characteristic points Pref correspond to the upper end of the skull, to the position of the armpits and to the position of the groin. These digital processing means 16 can implement all the known methods for detecting elements on an image, such as the Viola and Jones method for example.

Preferably, in order to detect the characteristic points Pref, the scatter plot is transformed into a depth image, i.e., a grayscale image, for example encoded on 12 bits enabling to encode depths ranging from 0 to 4095 mm. This depth image is then thresholded and binarized so as not to bring out with a value 1 the pixels corresponding to the object/body of interest and with a value 0 the pixels corresponding to the environment. Next, a contour detection is applied to this binarized image using, for example, the method disclosed in Suzuki, S. and Abe, K., Topological Structural Analysis of Digitized Binary Images by Border Following, CVGIP 30 1, pp 32-46 (1985). The salient points of the contour and its convexity defects (determined using, for example, the method Sklansky, J., *Finding the Convex Hull of a Simple Polygon*. PRL 1 $number, pp 79-83 (1982)) are used as characteristic points Pref.

Selection means 17 of the generic model m1, m2, m3 are then implemented to select the generic model m1, m2, m3 closest to the three-dimensional representation Re.

For example, this selection may be carried out by calculating the distance between the characteristic point Pref of the summit of the skull and the characteristic point of the groin so as to roughly estimate the height of the three-dimensional representation Re, and by selecting the generic model m1, m2, m3 for which the size by height is the closest. Similarly or in addition, the selection of the generic model m1, m2, m3 can be carried out using the width of the three-dimensional representation Re by calculating the distance between the characteristic points Pref of the armpits.

Additionally, the generic model m1, m2, m3 can be articulated by means of virtual bones representing the most important bones of the human skeleton. For example, fifteen virtual bones can be modeled on the generic model m1, m2, m3 to define the position and shape of the spine, femurs, tibias, ulna, humerus and skull. The orientation of these virtual bones enables defining the pose of the generic model, i.e., if the generic model m1, m2, m3 has one arm in the air, the legs apart . . . .

This pose of the generic model m1, m2, m3 can also be determined by the selection means 17 by comparing the distance (calculated, for example, using the Hu method. *Visual Pattern Recognition by Moment Invariants*, IRE Transactions on Information Theory, 8:2, pp. 179-187, 1962)) between the contour of the depth image of the object/body of interest with a database of depth image contours of the generic model in several thousands of postures. The depth image of the articulated generic model m1, m2, m3 closest to the depth image of the object/body of interest is selected and the rotation values of the virtual bones are saved.

A first adjustment is then carried out by adjustment means 18 by deforming the selected generic model so as to approach the three-dimensional representation Re. For example, this first adjustment can simply deform the width and height of the selected generic model, so that the spacing of the characteristic points Pref of the selected generic model corresponds to the spacing of the characteristic points Pref of the three-dimensional representation Re.

This first adjustment can also define the pose of the virtual bones of the generic model m1, m2, m3.

When the generic model is adjusted, i.e., the position of the vertexes is modified, the position of the points of the sequence of movements Tx pre-programmed on the generic model is adjusted in the same way.

Following this first rather coarse adjustment, it is possible to use a second more accurate adjustment by using the normal directions formed by each surface defined between the points of the three-dimensional representation Re.

To do this, the device incorporates means for calculating the normals 19 of each surface of the three-dimensional representation Re and of the selected generic model. For example, the normal directions can be determined by constructing each side of the three-dimensional representation Re by means of the coordinates of the three or four points closest to the point of interest. Alternatively, the normal directions of the generic model can be calculated during the step of defining the generic model. Alternatively, the two adjustments can be carried out simultaneously in one and the same step.

The device then uses search means 20 capable of detecting, for each point of the scatter plot of the three-dimensional representation Re, the point of the selected generic model in a close vicinity for which the difference between the normal direction of the point of the generic model and the normal direction of the point of interest is the smallest. When the virtual bones are a component of the selected generic model, the search means 20 adjust the position and the size of the virtual bones by varying the characteristics of each virtual bone in order to adjust the virtual bones to the position of the elements of the body present on the three-dimensional representation Re.

For example, the search means 20 can be configured for searching the points of the generic model in a predefined sphere around the point of interest. Preferably, the radius of this sphere is determined on the basis of the number of vertexes of the generic model and of the size of the object/body of interest so that about ten of the points are included in this sphere.

Using the set of these normal directions, the device can then calculate the difference between the selected generic model with the three-dimensional representation Re using determination means 21 capable of calculating the distance between the points of interest and the points detected by the search means on the selected generic model. The set of these distances forms transformation vectors which would have to be applied to the point of interest in order for it to correspond to the detected point.

Search means 22 are intended to determine an average of these transformation vectors so as to obtain an overall transformation of the selected generic model.

In other words, by considering a new transformation vector CompVec of M components, it is possible to know the three-dimensional configuration of the vertexes Pts3D by applying the following formula:

$$Pts3D = ModMoy + CompVec * ModSigma$$

For an unknown configuration Pts3D, for a new patient for example, the aim is to search for the values of the morphological components DiffMod, which correspond to this person knowing the mean model ModMoyen and the deformation matrix ModSigma.

To do this, the search means 22 calculate the difference between the three-dimensional configuration of the vertexes Pts3D and the mean model ModMoyen as well as the pseudo inverse matrix ModSigmaInv of ModSigma. For example, the pseudo inverse matrix ModSigmaInv can be calculated by decomposing the matrix ModSigma into singular values using the following relationships:

$$ModSigma = UEV^*;$$

$$ModSigmaInv = VE^{t}U^*;$$

with $E^t$ corresponding to the transposed matrix of E;
$V^*$ being the transconjugated matrix of V; and
$U^*$ being the transconjugated matrix of U.

Using these data, the search means 22 calculate the morphological components DiffMod with the following formula:

$$DiffMod * ModSigmaInv = CompVec * ModSigma * ModSigmaInv$$

That is to say, CompVec=DiffMod*ModSigmaInv which also enables obtaining the morphological components DiffMod for a specific patient.

The transformation vector CompVec is then applied to the selected generic model, the pose is again estimated as previously and the generic model adjusted, if necessary, and a new search is carried out until the generic model is fairly close to the three-dimensional representation Re. The loop stops when the average Euclidean distance among all the vertexes of the generic model and their correspondents on the scatter plot is smaller than a threshold defined on the basis of the number of vertexes of the generic model and the size of the object/body of interest, for example 2 mm, or when a maximum number of iterations, for example 100 iterations, is reached while the average distance smaller than the threshold is not reached.

In the same way as previously, when the generic model is adjusted, i.e., the position of the vertexes is modified, the position of the points of the sequence of movements Tx pre-programmed on the generic model is adjusted in the same way.

A calibration phase between the sensor 14 and the robot must often be carried out. Indeed, the sequences of movements Tx are defined on the generic model m1, m2, m3 in the orthonormal reference frame of the sensor 14, and the robot receives commands in its orthonormal reference frame which differs from that of the sensor 14. To calibrate the vision sensor 14 and the robot, it is possible to record the coordinates of at least three common points in the two reference frames. In practice, a number of points N greater than three is preferably used. The robot is moved over the work area and stops N times. At each stop, the position of the robot is recorded by calculating the movements carried out by the movement setpoint of the robot and a detection enables knowing the three-dimensional position of this stop by means of the vision sensor 14.

At the end of these N stops, the coordinates of the N points are known in the two reference frames. The barycenter of the distribution of the N points in the two reference frames is determined using the following relations:

BarycenterA=1/N sum(PA(i)) for i=1 to N with PA(i)
a point in the reference frame of the sensor 14;
and BarycenterB=1/N sum(PB(i)) for i=1 to N with
PB(i) a point in the reference frame of the robot.

The covariance matrix C is then determined by the following relation:

$$C = sum((PA(i) - BarycenterA)(PB(i) - BarycenterB)^t)$$
for i=1 to N

This covariance matrix C is then broken down into singular values:

$$C=UEV^*$$

The rotation matrix R between the two reference frames is then obtained by the following relation:

$R=VU^t$; if the determinant of R is negative, it is possible to multiply the third column of the rotation matrix R by −1.

The translation to be applied between the two reference frames is determined by the following relation:

$$T=-R*\text{Barycenter}A+\text{Barycenter}B$$

It is thus possible to turn any point of the reference frame of the sensor 14 Pa into the reference frame of the robot Pb by applying the following relation:

$$Pb=R*Pa+T$$

The invention thus enables programing a plurality of sequences of movements Tx on one or a plurality of generic models m1-m3 and to adjust these generic models m1-m3 efficiently in order to accurately reproduce the sequences of movements Tx on a surface whose geometry is not known when learning the sequences of movements Tx.

The robot can thus follow a sequence of movements Tx selected by the user or by an operator. A sequence of movements Tx may be more complex than a simple set of points and it may include different parameters intended to implement the sequence of movements Tx, such as the execution speed or the execution pressure. Additionally, the sequence of movements Tx may include positions for which actions are pre-programmed for the robot, such as the application of a vibration, a suction or a temperature.

The actions or parameters of the selected sequence of movements Tx may also be adjustable by the user or the operator before or during the execution of the sequence of movements by the robot. Thus, in the example of the robot for painting artisanal porcelains, the operator can set the painting speed and the bearing power of the brush on the porcelain. In the example of the massage robot, the user himself can choose the speed and force of the massage by setting the pressure of the robot in real time, in order to adjust these parameters to his sensations. He can also set a temperature emitted by the massage hand or the effects produced by this massage hand, such as the power of vibration or suction.

The invention claimed is:

1. A device for managing the movements of a robot configured to treat a surface, said device including:
   acquisition means for acquiring a three-dimensional representation (Re) of said surface to be treated; and
   an implemented computer processing comprising software having a determination subroutine that determines a sequence of movements on the basis of said three-dimensional representation (Re) of said surface to be treated;
   characterized in that said determination incorporates at least one three-dimensional generic model (m1-m3), comprising a deformation matrix of morphological components, and a plurality of three-dimensional sequences of movements (Tx) pre-programmed on said at least one three-dimensional generic model (m1-m3); said software including an adjustment subroutine that adjusts said generic model (m1-m3) with said three-dimensional representation (Re) of said surface to be treated that is able to search the values of the morphological components of the deformation matrix for which said generic model (m1-m3) corresponds to said three dimensional representation (Re) of said surface to be treated, the deformations of said generic model (m1-m3) being applied to the pre-programmed sequences of movements (Tx) so as to obtain at least new sequences of movements adjusted to the dimensions (Re) of said surface to be treated; said robot being configured to treat said surface on the basis of one of the new sequences of movements.

2. The device according to claim 1, wherein at least one known sequence of movements (Tx) incorporates positions for which actions are pre-programmed for said robot.

3. The device according to claim 1, wherein said generic model (m1-m3) and said three-dimensional representation (Re) of said surface to be treated being formalized in the form of scatter plots, said adjustment subroutine includes:
   a calculation of a normal direction to each point of said three-dimensional representation (Re) of said surface to be treated; and
   a search for each point of the scatter plot of said three-dimensional representation (Re), of the point of the generic model (m1-m3) in a close vicinity for which the difference between the normal direction of the point of the generic model (m1-m3) and the normal direction of the point of interest is the smallest;
   a determination of a distance between said detected point of the generic model (m1-m3) and said point of interest; and
   a search of an overall transformation of the generic model (m1-m3) on the basis of the distances determined for all the points of the scatter plot of said three-dimensional representation (Re).

4. The device according to claim 3, wherein the adjustment subroutine searches the points of the generic model in a predefined sphere around the point of interest.

5. The device according to claim 3, wherein the normal directions are determined by constructing a side by means of the coordinates of the three or four points closest to the point of interest.

6. The device according to claim 1, wherein said adjustment subroutine includes:
   the detection of characteristic points (Pref) on said three-dimensional representation (Re); and
   the deformation of the generic model (m1-m3) in rotation and/or translation, so that said position of said characteristic points correspond to a position of characteristic points of the generic model.

7. The device according to claim 1, wherein said acquisition means includes a pre-processing subroutine that pre-processes said three-dimensional representation (Re) by means of capturing a plurality of three-dimensional representations (Re) and perform an average of the coordinates of the points among the different three-dimensional representations (Re).

8. The device according to claim 7, wherein said pre-processing subroutine performs a filtering of said average of the coordinates of the points among the different three-dimensional representations (Re).

9. A treatment robot including:
   an articulated arm;
   an effector placed at one end of the articulated arm;
   a three-dimensional image capture device (Re); and
   a device for managing the movements according to claim 1.

10. A treatment robot according to claim 9, wherein said acquisition means are arranged on said articulated arm or said effector.

\* \* \* \* \*